UNITED STATES PATENT OFFICE 2,357,833

THERMOPLASTIC MOLDING COMPOSITION

Earle L. Kropscott and Melvin J. Hunter, Midland, Mich., assignors to The Dow Chemical Company, Midland, Mich., a corporation of Michigan No Drawing. Application October 20, 1941, Serial No. 415,782

13 Claims. (Cl. 106—182)

This invention relates to new thermoplastic molding compositions, and particularly to such compositions containing, as mold lubricants therefor, certain alkyl esters of hydroxy fatty acids.

It has long been recognized that, in the molding of organic thermoplastic compositions, it is necessary to employ agents to facilitate the release of the shaped article from the mold. In the extrusion of organic thermoplastics, it has also been found desirable, and is standard practice, to employ agents to facilitate the flow of plastic through the extrusion orifice. Various types of agents have been proposed for both of the above-suggested purposes. Of these, the commonest are stearic acid and its salts; the ester type waxes, including beeswax, carnauba wax, candelilla wax, and the like; and such hydrocarbon products as paraffin wax and paraffin oil. Each of the agents proposed has, of course, been of some slight assistance in attaining the desired object, but it is equally true that each of the prior lubricants for the purpose has been deficient, if not actually objectionable, in one or more important respects.

There are many molding compositions in which the fatty acids and soaps cannot be employed because at high temperatures these agents cause discoloration and induce embrittlement of the composition being molded. Many of the ester-type waxes are objectionable, either because of their odor, or because of their failure to improve the surface hardness of the molded article. The ester waxes frequently are found to soften the compositions. The mineral oil and paraffin, which have on occasion been employed, tend either to soften some compositions unduly, or to exude or bloom from the molded article on aging. It is an object of the present invention to provide a mold lubricant for organic thermoplastic compositions which will give good release of the shaped article from the mold and which will not bloom or cause discoloration or crazing or undue softening of the plastic after the molding operation. Other and related objects will appear hereinafter.

According to the present invention, the foregoing objects may be attained by employing, as an addition agent for organic thermoplastic molding compositions, a small amount of a lower alkyl ester of a hydroxy fatty acid containing from 12 to 24 carbon atoms. For the purpose of the present invention, the term "lower alkyl" refers to radicals containing from 1 to 8 carbon atoms, inclusive. The preferred addition agents of the present invention are, then, the various methyl, ethyl, propyl, butyl, amyl, hexyl, and octyl esters of mono-, di-, or tri-hydroxy long-chain fatty acids. It has been found that the new mold release agents are effective when used with cellulose esters such as cellulose acetate, cellulose acetate-butyrate, nitrocellulose, and the like; or with cellulose ethers, such as ethyl cellulose. They are also of value in molding and extruding compositions of styrene, vinyl esters, acrylic and methacrylic esters, and like polymeric resins. In contrast with the general experience when employing the usual ester waxes of the prior art, the new mold release agents do not seem to be affected materially by changes in the type of plasticizer employed in the molding composition. Some of the heretofore used waxes could be employed, for example, when organic phthalates were the plasticizers in the composition, but not when organic phosphates were employed. The herein employed agents are not sensitive to changes in the molding compositions, and, therefore, they are susceptible of much wider general utility.

Particular esters which have been found especially desirable for the present purpose are the various methyl, ethyl, propyl, and butyl esters of 12-hydroxy stearic acid, 9,10-di-hydroxy stearic acid, and 9,10,12-tri-hydroxy stearic acid. Other useful compounds include the corresponding lower alkyl esters of the hydroxy acids containing from 12 to 24 carbon atoms which may be prepared, for example, according to the method disclosed by Tomecko and Adams in the Journal of the American Chemical Society, vol. 49, page 522 (1927). 12-hydroxy stearic acid is readily prepared by hydrogenation of castor oil and saponification to remove the glyceryl radical. 9,10-di-hydroxy stearic acid may be obtained by the controlled oxidation and hydration of oleic acid, and the 9,10,12-tri-hydroxy stearic acid is obtainable by similar treatment of ricinoleic acid. The new addition agents are generally employed and are effective as mold release agents in amounts from 0.5 to 5 per cent of the weight of the thermoplastic material being molded.

The following examples illustrate various plastic formulations which have been molded or extruded satisfactorily, and in which the new mold release agents have been found to be advantageous. The examples are not to be construed as limiting the invention:

Example 1

The following plastic formulation was blended on compounding rolls in known manner:

| | Parts |
|---|---|
| Ethyl cellulose | 85 |
| Plasticizer (mixed phosphates) | 15 |
| Methyl ester of 12-hydroxy stearic acid | 2 |
| Titanium oxide pigment | 0.5 |

The composition was molded and the shaped articles were found not only to release easily from the injection die but, also, to have a fairly hard, glossy surface of good color. This formulation was compared in properties with others which differed from it only in that stearic acid was employed as the mold release agent instead of methyl 12-hydroxy stearate. The molded stearic acid composition had a slightly darker color, poor surface gloss, and did not stand up well in comparison with the composition of the present invention under outdoor weathering conditions.

Example 2

The methyl ester of 12-hydroxy stearic acid has been found to be useful as a lubricant in the extrusion of ethyl cellulose plastic composition. One such composition consists of:

| | Per cent |
|---|---|
| Ethyl cellulose | 70 |
| Monophenyl di-orthoxenyl phosphate | 29 |
| Methyl 12-hydroxy stearate | 1 |

Extruded articles made from this composition have a higher gloss and fewer die marks than do similar compositions containing as the lubricant such heretofore standard materials as stearic acid, sodium stearate, and paraffin oil.

Example 3

Ethyl 12-hydroxy stearate was added to a portion of a basic formulation consisting of 80 per cent ethyl cellulose and 20 per cent of an organic phosphate plasticizer. Portions of each composition were molded between polished plates at 1,000 pounds pressure per square inch and at the temperature of 120 pounds steam. The first composition, without the mold release agent, stuck to the plates and gave an entirely unsatisfactory molding. The modified composition, containing 0.5 per cent of ethyl 12-hydroxy stearate, released easily from the mold, and the shaped article had good surface hardness and a high gloss.

Example 4

A plastic mix containing:

| | Parts |
|---|---|
| Cellulose acetate | 100 |
| Diethyl phthalate | 30 |
| Triphenyl phosphate | 10 |
| Methyl 12-hydroxy stearate | 1 | released easily from both hot and cold molds, and the shaped articles had good surface hardness and luster.

The foregoing compositions have been given purely by way of illustration. Numerous other molding compositions, having as their thermoplastic base any of the thermoplastic organic molding materials, may be improved by the inclusion therein of small amounts of the herein defined mold release agents. The invention is not limited in its application to cellulose derivative molding compositions, as it has been found that the new agents are also effective and may be advantageously employed in the molding of polystyrene compositions and those of polyvinyl chloride, polyvinyl acetate, methyl methocrylate, the co-polymers of vinylidene chloride, and other thermoplastic polymers. In each case the release agent is effective in low enough concentration so that it does not bloom out on the surface of the molded article on prolonged standing and does not materially alter the physical properties of the molded composition.

Example 5

Several portions of polystyrene were each colloided on a two-roll mill with one of the esters of 12-hydroxy stearic acid, in amounts varying from 0.1 to 18 per cent based on the weight of styrene. The compositions were sheeted off the rolls, cut into small pieces, and compression molded between highly polished but unlubricated plates, at a temperature of about 150° C. The moldings were cooled, and removed from the polished plates, attention being given to the relative ease or difficulty of separation. In every case in which more than 0.2 per cent of the ester was employed, the molding came free from the plate without effort, and this was true of the methyl, ethyl, propyl, butyl, and isobutyl esters tested. In all cases in which less than about 7 per cent of the ester was used, the molding was clear and glossy. Larger amounts of the methyl ester, and over 10 per cent of the butyl ester, proved to be beyond the limit of compatibility, and to give slightly hazy moldings. The effects of the present esters on the properties of injection molded polystyrene were determined. In amounts between about 0.5 and 5 per cent the strength and heat distortion values were not appreciably modified, but the molding temperature and plastic flow temperature were both lowered a few degrees, permitting faster molding cycles and lower working pressures without impairing the surface properties of the product.

In manner similar to that described in Example 5, the new mold lubricants were tested in methyl methacrylate molding compositions, and results similar to those obtained with styrene were observed.

The esters here concerned have been compared with many of the heretofore customary mold lubricants and release agents, to determine the respective lubrication value of the esters and the quality and surface hardness of moldings produced. "Lubrication value" was arbitrarily rated at from 1 to 10, depending on the ease with which moldings, made under standard conditions, could be separated from the mold. The sample most difficult to remove was rated 10, and the easiest was rated 1. The condition of the surface of molded samples with respect to flaws was used in evaluating the "molding quality" of the various lubricants. The samples were tested for scratch-resistance, those having high scratch-proofness being rated 1, and those of very poor resistance being rated 10. The samples were also inspected for surface glaze and lubricant retention. Each lubricant was employed in 4 per cent concentration in an ethyl cellulose molding composition. The results are given in the following table:

Table

| Lubricant | Lubrication value | Molding quality | Scratch resistance | Surface gloss | Wax retention |
|---|---|---|---|---|---|
| Methyl 12-hydroxy stearate | 1 | Good | 2 | Good | Good. |
| Ethyl 12-hydroxy stearate | 2 | ---do--- | 3 | ---do--- | Do. |
| Methyl 9, 10-dihydroxy stearate | 2-3 | ---do--- | 5 | ---do--- | Do. |
| Candelilla wax | 6 | Poor | 6 | Fair | Poor. |
| Ceresine wax | 10 | Good | 4 | Good | Do. |
| Carnauba wax | 9 | Poor | 5 | Fair | Do. |
| Beeswax | 9 | Good | 6 | Poor | Do. |
| Montan wax | 5 | ---do--- | 6 | Good | Do. |
| Opal wax (12-hydroxy stearin) | 8 | ---do--- | 7 | Poor | Do. |
| Palm wax | 6 | Poor | 4 | ---do--- | Do. |
| Stearic acid | 4 | Fair | 6 | Fair | Good. |
| Shellac wax | 9 | ---do--- | 6 | Poor | Poor. |
| Japan wax | 6 | Poor | 10 | ---do--- | Do. |
| Paraffin wax | 2 | Good | 3 | ---do--- | Do. |

For general all-around utility, the herein-concerned lower alkyl esters of mono-, di-, and tri-hydroxy fatty acids are superior lubricants in plastic molding and extrusion compositions, when compared with the waxes previously employed for the same purpose. They are effective in low concentrations, and in any of a wide variety of plastics, and are unaffected by the plasticizers and softeners present in the composition so far as lubrication value is concerned.

We claim:

1. A thermoplastic composition including a synthetic thermoplastic polymer and, as a lubricant therefor, a small proportion of a lower alkyl ester of a saturated hydroxy fatty acid, wherein the alkyl group contains from 1 to 8 carbon atoms, and the fatty acid contains from 12 to 24 carbon atoms and from 1 to 3 hydroxyl groups.

2. A thermoplastic composition including a synthetic thermoplastic polymer and, as a lubricant therefor, a small proportion of a lower alkyl ester of a hydroxy stearic acid, wherein the alkyl group contains from 1 to 8 carbon atoms, and the acid contains from 1 to 3 hydroxyl groups.

3. A thermoplastic composition including a synthetic thermoplastic polymer and, as a lubricant therefor, a small proportion of a lower alkyl ester of 12-hydroxy stearic acid, wherein the alkyl group contains from 1 to 8 carbon atoms.

4. A thermoplastic composition including a synthetic thermoplastic polymer and, as a lubricant therefor, a small proportion of a lower alkyl ester of 9,10-di-hydroxy stearic acid, wherein the alkyl group contains from 1 to 8 carbon atoms.

5. A thermoplastic composition including a synthetic thermoplastic polymer and, as a lubricant therefor, a small proportion of a lower alkyl ester of 9,10,12-tri-hydroxy stearic acid, wherein the alkyl group contains from 1 to 8 carbon atoms.

6. A composition of matter comprising a thermoplastic cellulose derivative and, as a lubricant therefor, a small proportion of a lower alkyl ester of a saturated hydroxy fatty acid, wherein the alkyl group contains from 1 to 8 carbon atoms, and the fatty acid contains from 12 to 24 carbon atoms and from 1 to 3 hydroxyl groups.

7. A composition of matter comprising a thermoplastic ethyl cellulose and, as a lubricant therefor, a small proportion of a lower alkyl ester of a saturated hydroxy fatty acid, wherein the alkyl group contains from 1 to 8 carbon atoms, and the fatty acid contains from 12 to 24 carbon atoms and from 1 to 3 hydroxyl groups.

8. A composition of matter comprising a synthetic thermoplastic polymer and, as a lubricant therefor, a small proportion of a lower alkyl ester of a saturated hydroxy fatty acid, wherein the alkyl group contains from 1 to 8 carbon atoms, and the fatty acid contains from 12 to 24 carbon atoms and from 1 to 3 hydroxyl groups.

9. A composition of matter comprising polystyrene and, as a lubricant therefor, a small proportion of a lower alkyl ester of a saturated hydroxy fatty acid, wherein the alkyl group contains from 1 to 8 carbon atoms, and the fatty acid contains from 12 to 24 carbon atoms and from 1 to 3 hydroxyl groups.

10. A thermoplastic molding composition comprising ethyl cellulose and, as a lubricant therefor, a small proportion of a lower alkyl ester of 12-hydroxy stearic acid, wherein the alkyl group contains from 1 to 8 carbon atoms.

11. A thermoplastic molding composition comprising ethyl cellulose and, as a lubricant therefor, a small proportion of methyl 12-hydroxy stearate.

12. A thermoplastic molding composition comprising polystyrene and, as a lubricant therefor, a small proportion of a lower alkyl ester of 12-hydroxy stearic acid, wherein the alkyl group contains from 1 to 8 carbon atoms.

13. A thermoplastic molding composition comprising polystyrene and, as a lubricant therefor, a small proportion of methyl 12-hydroxy stearate.

EARLE L. KROPSCOTT.
MELVIN J. HUNTER.